April 9, 1929.  J. A. WRIGHT  1,708,248
REAR AXLE ASSEMBLY
Filed Dec. 8, 1927

Inventor
James A. Wright
By
Attorney.

Patented Apr. 9, 1929.

1,708,248

UNITED STATES PATENT OFFICE.

JAMES A. WRIGHT, OF MONTREAL, QUEBEC, CANADA.

REAR-AXLE ASSEMBLY.

Application filed December 8, 1927. Serial No. 238,685.

This invention relates to motor vehicles, and particularly to the rear axle assembly of motor chassis having transverse spring suspension.

The object of the invention is to provide an improved form of spring seating differential casing, with a removable worm casing forming the bottom thereof, as well as other features which will be set forth hereinafter.

The invention consists in a differential casing having transverse spring seats above and at each side of the differential mechanism, while the worm drive with its casing is secured to the open bottom of the differential casing and is readily removable therefrom. The lower transverse springs are anchored to their seats above and entirely free from the worm casing.

The wheel carrier is specifically adapted to be coupled with transverse springs encased in the boxed radius rods covered in my pending application Serial No. 238,401, filed Dec. 7, 1927 in which these boxed radius rods are journalled on the pivot pins of the wheel carrier.

Reference is made to the accompanying drawings, in which:—

Figure 1:
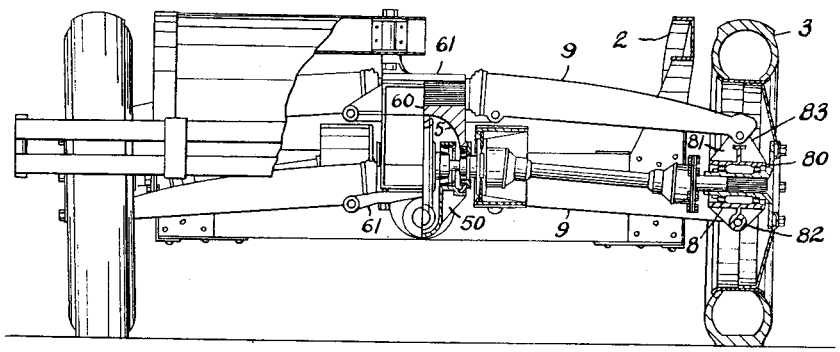
Figure 1 is a rear view of the assembly, partly in section.
Figures 2, 3:
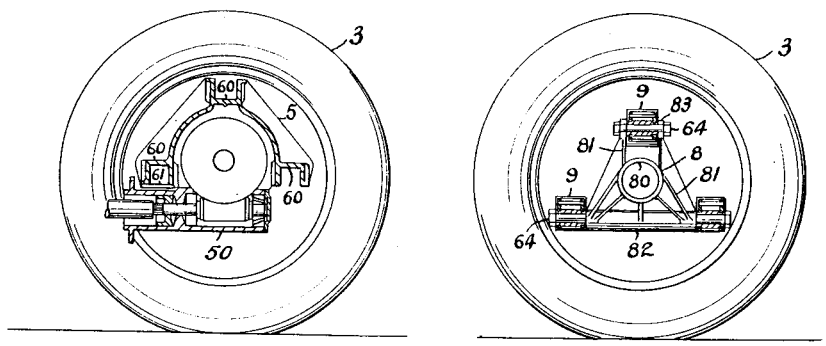
Figure 2 is a central vertical cross section of Figure 1 with the springs removed.
Figure 3 is an inside view of the wheel and wheel carrier.

The differential casing 5 is of substantially triangular cross section, with transverse spring seats 60 at the apex and at each side of the open bottom.

The worm casing 50 has lateral extensions and forms the bottom plate of the differential casing 5 to which it is bolted so as to be readily removable therefrom when required.

The anchor plates 61 of the lower springs 9 are above the worm casing 50 and are entirely free from it, permitting the removal of the worm gear without disturbing the spring mounting. It also provides a strong and rigid spring mounting.

The wheel carrier 8 in which the wheel 2 is journalled, has an upwardly projecting forked bearing 83 supporting the pivot bolt 64 to which the upper spring 9 is coupled and at the bottom a bored bearing 82 in which the pivot bolt 64 is journalled. The lower springs 9, 9, are coupled to the ends of the bolt 64 on either side.

Ribs 81 on each side, extend from the sleeve 80 to the upper and lower bearings 83 and 82 and give the wheel carrier great strength with light weight. This is important as the wheel carrier is the only part of the assembly that is not supported on the springs.

By means of this construction a transverse spring mounting is provided having many advantages.

The whole of the drive mechanism, including the differential the worm drive, the Cardan shafts and the brake apparatus can be removed without affecting the spring suspension of the rear axle assembly.

The form of the differential casing provides a very substantial and rigid housing for the springs, well balanced and of great convenience when repairs or readjustments have to be made to the drive mechanism.

Added to this, the wheel carrier with its broad sleeve and rigid design, when coupled to the springs, will maintain the wheel in true vertical parallelism with the chassis frame.

I claim:

1. In a motor chassis having transverse spring suspension, a differential casing having spring seats above and at each side of the differential therein, and a worm casing forming the bottom of the differential casing.

2. In a motor chassis having transverse spring suspension, a differential casing having transverse spring seats above and at each side thereof, an open bottom, and a worm casing removably secured thereto to form a bottom plate.

3. In a motor chassis, having transverse spring suspension, a differential casing having transverse spring seats above and at each side thereof, an open bottom thereto, a worm casing secured to the bottom, and spring anchor plates to the side seats independent and free from the worm casing.

4. In a motor chassis having transverse spring suspension, transverse springs seated in the top and sides of a differential casing, the outer ends of the springs coupled to wheel carriers on which the wheels are journalled, and means to remove the drive mechanism without disturbing the spring suspension.

5. In a motor chassis having transverse spring suspension, a differential casing having transverse spring seats in the top and sides thereof, a worm casing removably secured to the open bottom, springs anchored in the seats above and independent of the worm casing and coupled at their outer ends to wheel carriers on which the wheels are journalled.

6. In a motor chassis having transverse spring suspension, a differential casing having spring seats above and at each side of the differential therein, and means to remove the drive mechanism without disturbing the spring suspension.

7. In a motor chassis having transverse spring suspension, a differential casing having transverse spring seats above and at each side thereof, an open bottom thereto, a worm casing removably secured to the bottom of the differential casing, beneath and free from the spring suspension.

JAMES A. WRIGHT.